United States Patent
Schleicher et al.

(10) Patent No.: US 6,497,636 B2
(45) Date of Patent: Dec. 24, 2002

(54) METHOD AND APPARATUS FOR CONTROLLING A CONTINUOUSLY VARIABLE AUTOMATIC TRANSMISSION

(75) Inventors: Thomas Schleicher, Munich (DE); Thomas Kress, Dachau (DE); Lothar Wolf, Munich (DE)

(73) Assignee: Bayerische Motoren Werke Aktiengesellshaft, Munich (DE)

( * ) Notice: Subject to any disclaimer, the term of this patent is extended or adjusted under 35 U.S.C. 154(b) by 51 days.

(21) Appl. No.: 09/737,945

(22) Filed: Dec. 18, 2000

(65) Prior Publication Data

US 2001/0004619 A1 Jun. 21, 2001

(30) Foreign Application Priority Data

Dec. 18, 1999 (DE) .......................... 199 61 312

(51) Int. Cl.[7] ............................... B60K 41/12
(52) U.S. Cl. ...................... 477/37; 477/110; 477/107
(58) Field of Search ........................ 477/37, 44, 107, 477/110

(56) References Cited

U.S. PATENT DOCUMENTS

| | | | |
|---|---|---|---|
| 4,459,878 A | * 7/1984 | Frank | 477/107 |
| 5,150,635 A | * 9/1992 | Minowa et al. | 477/107 |
| 5,521,819 A | 5/1996 | Greenwood | 364/424.1 |

FOREIGN PATENT DOCUMENTS

| | | |
|---|---|---|
| DE | 42 23 967 A1 | 7/1992 |
| DE | 197 26 194 A1 | 6/1997 |

* cited by examiner

*Primary Examiner*—Richard M. Lorence
*Assistant Examiner*—Eric M Williams
(74) *Attorney, Agent, or Firm*—Crowell & Moring LLP

(57) ABSTRACT

In a method and apparatus for controlling a driving engine/transmission unit having a continuously variable automatic transmission, the transmission output torque acting upon the driving wheels of a vehicle and the engine reaction torque retroacting upon the driving engine can be adjusted by way of a regulated transmission variable. For operating the control as both a torque and transmission ratio regulator, it is suggested to predefine a desired transmission output torque, and to determine the regulated transmission variable, the transmission output power, a transmission power loss, the power requirement of the driving engine (from the transmission output power and the transmission power loss), a desired engine torque and a desired rotational engine speed, a corrected desired engine torque and/or a corrected desired transmission output torque in conjunction with a change of the regulated transmission variable (torque regulator operation) and/or a desired transmission ratio and a desired engine torque with a change of the regulated transmission variable, in such a manner that a determined actual transmission ratio coincides with a calculated desired transmission ratio (transmission ratio regulator operation).

11 Claims, 3 Drawing Sheets

METHOD AND APPARATUS FOR CONTROLLING A CONTINUOUSLY VARIABLE AUTOMATIC TRANSMISSION

BACKGROUND AND SUMMARY OF THE INVENTION

This application claims the priority of German patent document 199 61 312.5, filed Dec. 18, 1999, the disclosure of which is expressly incorporated by reference herein.

The invention relates to a method and apparatus for controlling a continuously variable automatic transmission in which the transmission output torque acting upon the driving wheels of a vehicle and the engine reaction torque retroacting upon the driving engine can be adjusted by way of a regulated transmission variable.

So-called CVT transmissions (continuously variable transmissions) have continuously variable gears in which a defined and desired gear ratio can be adjusted by way of the most variable drives (such as belts and bevel gears).

Furthermore, there are continuously variable transmission gears in which transmission output torque can be adjusted by the regulated transmission variable. The transmission output torque acting upon the driving wheels determines by way of the physical transmission quantities the engine reaction torque retroacting upon the driving engine. The ratio in the transmission occurs as a function of the torque balance at the engine interface. Transmissions of the type described above are commercially available, for example, from Torotrak Company. In the invention described in the following, specifically such a continuously variable transmission gear is used which has an adjustable transmission torque.

It is an object of the present invention to provide a method and apparatus for controlling a continuously variable automatic transmission, with which a transmission regulator or moment regulator operation can easily be carried out.

This and other objects and advantages are achieved by the present invention, in which the transmission power loss is calculated, for example, by means of a physical model, and a desired transmission output power provided from a demand determination is added. On the whole, this results in a power demand of the driving engine which at the time is composed specifically of the desired transmission output power and of the transmission power loss relative to the desired operating point. By thus taking into account of the transmission power loss, starting is permitted in a system in which the power is considered.

In this case, the desired transmission output torque for providing a desired transmission output power is generated particularly from a wheel torque requirement. The power demand of the driving engine is the basis for determining the desired engine torque as well as of the desired rotational speed of the engine. Both operating point values of the engine can be calculated by means of given algorithms or can be selected by means of given values (generating of the operating point).

During operation in the torque regulator mode, a specific transmission output torque is set which causes a reaction torque on the other side of the transmission. The transmission ratio occurs as a consequence of the torque balance at the engine interface, satisfying the equilibrium condition between the engine torque provided by the engine and the engine reaction torque.

In contrast, during operation in the transmission regulator mode, the transmission control implements a specific defined ratio. In a first approximation, the driving torque will then be a result of the given engine torque; specifically a function of the transmission ratio and its losses.

In a transmission whose output torque is to be adjusted, the process and apparatus described above permit operation in the torque regulator mode, in the transmission ratio regulator mode or in a mixed operation.

During operation in the torque regulator mode, the rotational speed of the engine is regulated to a desired rotational speed which is the result of generating the operating point. According to a first control alternative, the desired engine torque is corrected as a function of the difference between the actual rotational engine speed and a desired rotational engine speed for reaching the desired rotational speed. According to a concurrent second control alternative, the regulated transmission variable is changed so as to obtain a corrected desired transmission output torque. Preferably, the first control alternative is given priority, because it requires no torque change at the transmission output. Only the engine demand is varied in order to achieve the required desired rotational speed by way of the engine torque excess or underrecovery.

If the available engine potential is not sufficient, it is necessary to reduce the desired transmission output torque and thus the engine reaction torque. This, however, results in a torque collapse at the transmission output.

In order to ensure this priority as between changing the desired engine torque and changing the desired transmission output torque during the torque regulator operation mode, it is advantageous to check whether the desired engine torque can be implemented by the driving engine. This can be done, for example, by means of a model calculation.

In contrast, during operation in the transmission ratio regulator mode, the regulated transmission variable is adjusted so that the actual transmission ratio corresponds to a calculated desired transmission ratio. In this case, the actual transmission ratio is preferably determined from the actual rotational engine and transmission speeds. The desired transmission ratio may be determined from the desired engine rotational speed and the actual rotational transmission output speed, by means of a defined algorithm, or by means of defined values.

In the transmission ratio regulator operating mode, by changing a regulated transmission variable, the actual transmission ratio can also be regulated in a targeted manner to a value which differs from the desired transmission ratio. Such deviation may be required for a brief period in order to take into account special system conditions or to implement special requirements.

Other objects, advantages and novel features of the present invention will become apparent from the following detailed description of the invention when considered in conjunction with the accompanying drawings.

DETAILED DESCRIPTION OF THE DRAWINGS

Figure 1:
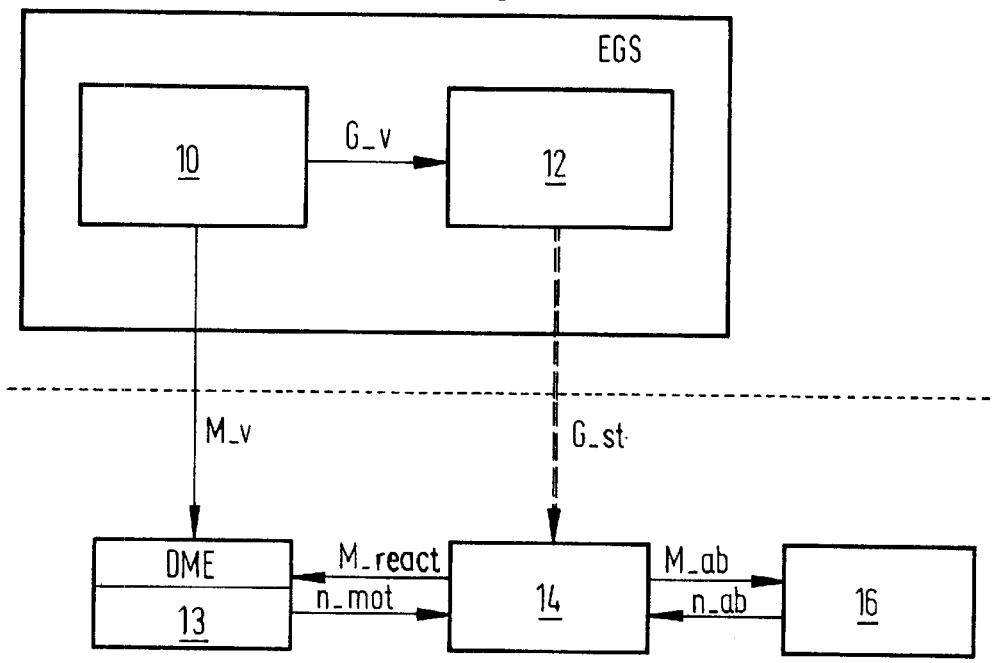
FIG. 1 is a schematic diagram which shows the connection of hardware components in a first embodiment of the present invention.

FIG. 1 is a diagrammatic representation of a controlled system according to the invention, which includes an engine 13, a transmission 14 and the vehicle 16. The engine 13, which is controlled by a digital engine control DME, supplies a specific engine power (actual engine power) to the transmission; that is, a rotational engine speed is supplied to the transmission 14 and a an engine reaction torque (corresponding to the actual engine torque) from the transmission 14 is supported. In turn, by way of a regulated transmission variable, the engine reaction torque is created and a specific transmission output torque is implemented. The transmission output torque M_ab acts by way of the shafts and the rear-axle transmission upon the driven wheels of a vehicle 16. The behavior of the rotational transmission output speed is determined from the balance of the wheel torques and is impressed on the transmission.

In the present case, the transmission 14 is based on the operating principle of a torque regulator. That is, the transmission output torque M_ab is adjusted by a regulated transmission variable G_st and simultaneously an engine reaction torque M_react is generated which retroacts on the engine 13.

In this type of transmission, the ratio in the transmission 14 is determined by the torque balance at the engine interface, where an equilibrium occurs between the engine reaction torque M_react and the torque (actual engine torque) provided by the engine (consisting of the combustion and rotation torque).

The digital electronic engine control DME receives its predefinitions from the electronic transmission control EGS. In the present embodiment, the latter has two modules: one module 10 is close to the vehicle, which a second module 12 is close to the transmission. The functions of both modules will be explained in the following.

First, it should be noted that the module 10 close to the vehicle transmits to the digital engine control DME an engine predefinition M_v in the form of a torque request, which is used by the digital engine control DME to determine the regulated variables of the engine 13 (such as ignition, filling). In addition, the module 10 close to the vehicle also emits a signal G_v to the module 12 close to the transmission. As a function of this signal G_v, the module 12 generates the regulated transmission variable G_st and supplies it to the transmission 14.

Based on vehicle operator values, vehicle values and environmental values as well as system values of the transmission line (that is, engine, transmission and transmission line data), the module 10 close to the vehicle generates the predefinition M_v to the digital engine control DME and can be called the master module.

The module 12 close the transmission determines the required regulated variables G_st based on predefinition G_v of the module close to the vehicle and system values of the transmission. To this extent, the module 12 can be called a slave module.

Figure 2:
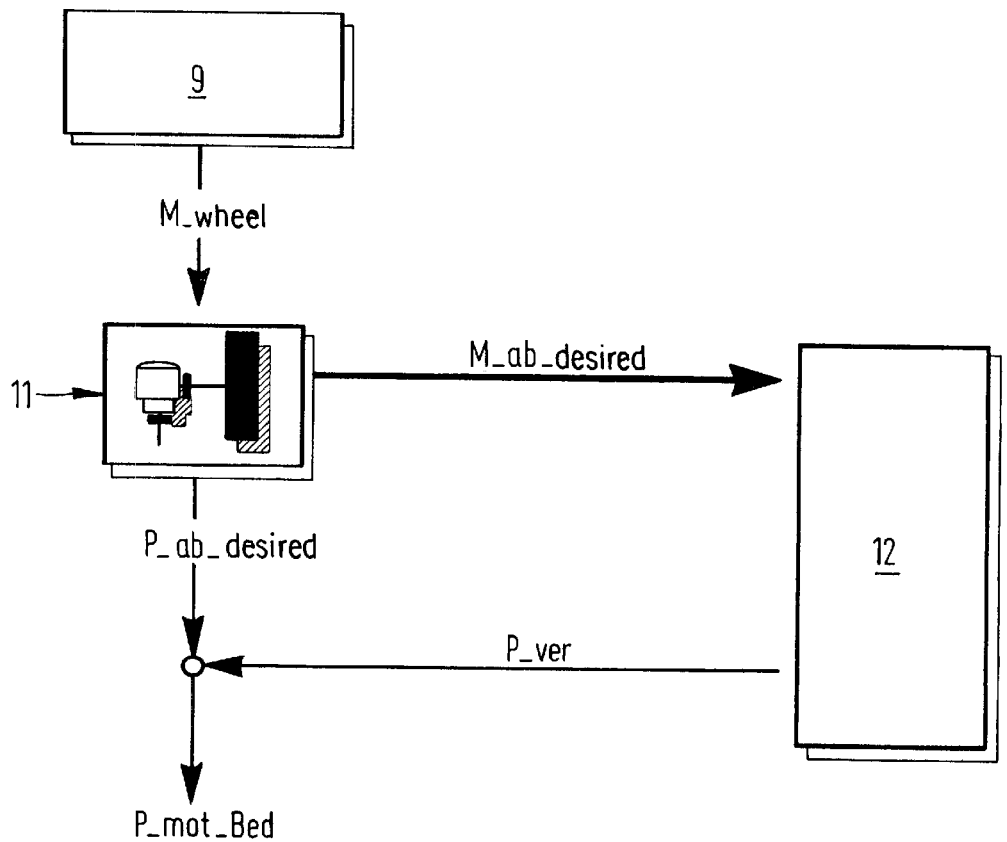
FIG. 2 is a block diagram which illustrates the determination of the engine power demand.

FIG. 2 illustrates a first stage of the described embodiment of a method and apparatus according to the invention. In an input module 9, a wheel torque requirement M_wheel (representing a torque desired at the driven wheels) is determined from vehicle operator data, vehicle data or environmental data (such as the accelerator pedal position, the vehicle speed v, information of external vehicle control systems, etc.). The wheel torque requirement M_wheel is transmitted to a module 11, which uses it, together with an inverse physical model of the output line (consisting of a physical description of the drive shafts, the rear axle transmission and the propeller shaft), to determine a desired transmission output torque $M\_ab_{desired}$. In this case, losses, rigidities or other known influences in the output line are also taken into account.

Naturally, other predefinitions can also be superimposed on the desired transmission output torque $M\_ab_{desired}$, which result particularly from reactive functions or from functions with high dynamic requirements, such as the safety functions, and result in a targeted deviation of the predefined wheel torque M_wheel. Such a superimposition will be discussed later within the scope of a control alternative during the torque regulator operation.

During operation of the system according to the "torque regulator" operating principle, the desired transmission output torque $M\_ab_{desired}$ is communicated directly to the module 12 close to the transmission. The latter module determines the power loss P_ver occurring in the transmission, which is then added to a desired output power of the transmission $P\_ab_{desired}$ which also originates from the module 11. This desired output power $P\_ab_{desired}$ is obtained from the required desired transmission output torque $M\_ab_{desired}$ (in FIG. 1, also M_ab) and the real rotational transmission output speed n_ab.

The transmission power loss P_ver is determined by way of a physical model, which is contained in the module 12 close to the transmission. In this case, the desired transmission output torque $M\_ab_{desired}$ is one of several model input values to the transmission power loss model. The functionality (that is, the physics on which the power loss model is based) is of course a function of the actual transmission construction; that is, of the applied operating principle, the used variator or starting element.

Taking into account the power loss occurring in the transmission, relative to the desired operating point, is particularly important for implementing the starting operation when power is used as the basis. The sum of the transmission power loss P_ver and of the desired transmission output power $P\_ab_{desired}$ yields the total power requirement to be demanded from the driving engine. This power is required for implementing the above-mentioned predefinitions.

Figure 3:
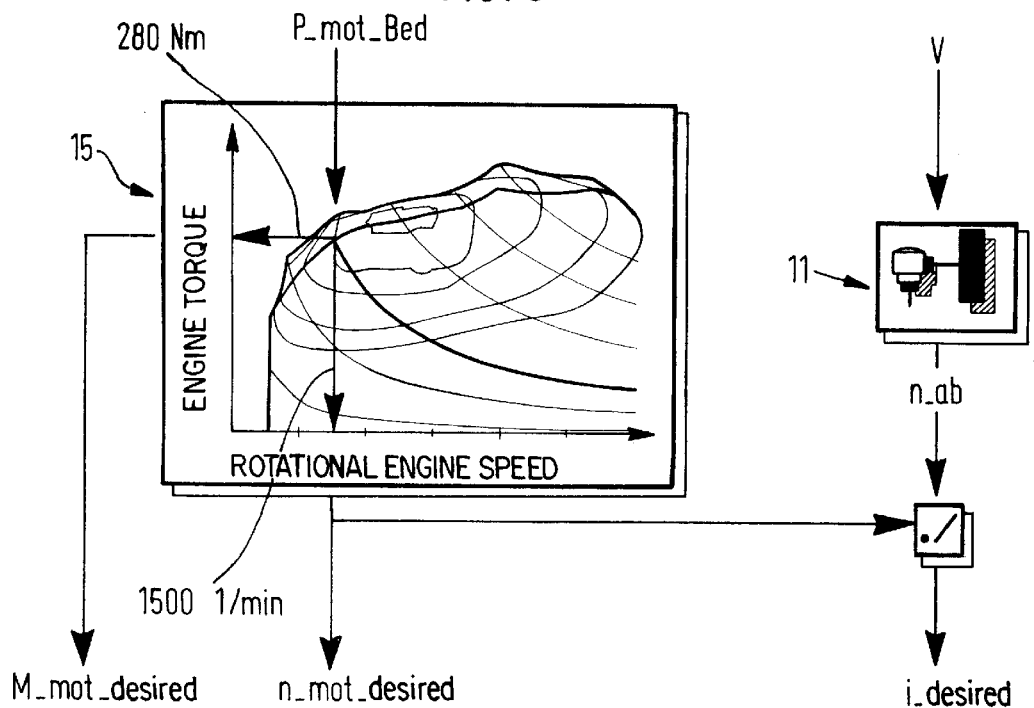
FIG. 3 is a diagrammatic illustration of the generation of operating points.

The different operating points can now be determined from the power requirement of the driving engine, in the manner illustrated in FIG. 3. This figure shows a unit 15 in which the engine torque courses are stored as a function of the rotational engine speed. According to the driving situation and the driver's intention, a characteristic curve can be selected from the set of characteristic curves contained in unit 15. A pertaining rotational engine speed/engine torque pair can then be obtained by way of the point of intersection between the selected characteristic torque curve and the power demand hyperbola.

For each operating point, therefore, the desired engine torque $M\_mot_{desired}$ and the desired rotational engine speed $n\_mot_{desired}$ can therefore be determined in the unit 15. Furthermore, the rotational transmission output speed n_ab can be determined by way of the vehicle speed v in the module 11, or can be detected directly by measuring. Together, the rotational transmission output speed and the rotational engine speed $n\_mot_{desired}$, determines a desired transmission ratio $i_{desired}$ which is important for the transmission ratio regulator operation illustrated below.

Alternatively, this can be determined by means of a given algorithm or by means of defined values.

Therefore, corresponding to a driving intention requirement (wheel torque requirement), the desired transmission output torque to be implemented, the desired engine torque $M\_mot_{desired}$, the desired rotational engine speed $n\_mot_{desired}$ and the desired transmission ratio $i_{desired}$, and thus the engine and transmission operating points, are present. Relevant criteria when forming the operating points, with respect to the wheel torque requirement, are the environmental and driving situation as well as the drivability and the overall efficiency of the engine, the acoustics and the driving characteristics.

In the torque regulator operation mode, the transmission operating point is predefined by way of the described resulting desired transmission output torque $M\_ab_{desired}$.

In contrast, during the transmission ratio regulator operation, the predefining of the transmission operating point is predefined by way of the desired transmission ratio $i_{desired}$ which can be determined (in one embodiment) from the actual rotational transmission output speed $n\_ab$ and from the desired rotational engine speed $n\_mot_{desired}$, taking into account the engine operating point. In other embodiments it may be determined by means of a defined algorithm or by means of defined values.

Figure 4:
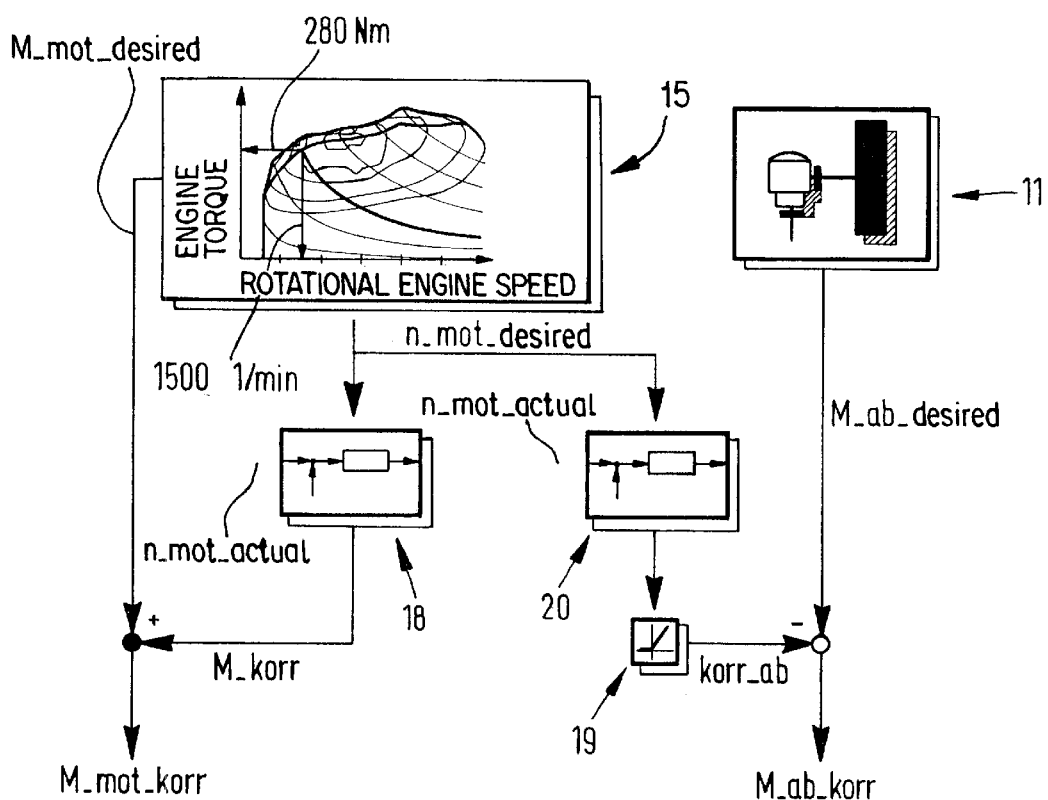
FIG. 4 is a diagrammatic illustration of the control in the torque regulator operation.

Torque regulator operation is illustrated in FIG. 4. A desired engine torque $M\_mot_{desired}$ obtained from unit 15 is the basic value to be transmitted to the digital engine control DME. In addition, the desired rotational engine speed $n\_mot_{desired}$ is emitted to a regulator 18 which receives the actual rotational engine speed $n\_mot_{actual}$ as an additional input. From the deviation of the two rotational engine speeds, (the desired and actual rotational speeds), a correction value $M\_korr$ is calculated which represents a torque which has the required potential for bringing the actual rotational engine speed $n\_mot_{actual}$ to the desired rotational engine speed $n\_mot_{desired}$. The torque M korr is added to the desired engine torque $M\_mot_{desired}$, which results in a corrected engine torque $M\_mot\_korr$. This corrected engine torque $M\_mot\_korr$ acts upon the digital engine control DME, which then controls the engine operation to generate the corrected engine torque $M\_mot\_korr$. As a result, the actual rotational engine speed can be regulated to the desired rotational engine speed.

However, in this type of regulation, it is possible that the physical limits of the engine may be reached, so that (particularly at an operating point on a full-load curve), a positive increase of the engine torque is no longer possible.

Thus, the engine may not be able to provide the necessary engine torque. In this case, a second regulation alternative will be used, which is illustrated on the right in FIG. 4. For this purpose, the rotational engine speed $n\_mot_{desired}$ is supplied to a second regulator 20 which also receives the actual rotational engine speed $n\_mot_{actual}$. By comparing the two rotational speed values, a value is determined which is converted in the device 19 into an exclusively positive correction output torque $M\_korr\_ab$. This correction output torque $M\_korr\_ab$ is then subtracted from the desired transmission output torque $M\_ab_{desired}$, which results in a corrected transmission output torque $M\_ab_{korr}$. The latter is then implemented by the transmission 14 via the module 12 close to the transmission.

By means of this approach, a reduction is achieved in the defined desired transmission output torque $M\_ab_{desired}$ (and thus in the engine reaction torque $M\_react$), so that the engine will once again have sufficient potential to implement the desired rotational engine speed $M\_mot_{desired}$. However, this results in a negative deviation of the desired transmission output torque. The regulating device exclusively operates such that the desired transmission output torque $M\_ab_{desired}$ is reduced. An independent increase of the output torque relative to the driver's predefinition is excluded for reasons of safety.

In the first regulating alternative, the desired transmission output torque is implemented according to the redefinition; accordingly, this first regulating alternative should be preferred. Thus, the superimposed second regulating alternative (which adjusts a torque surplus via a reduction of the engine reaction moment) will be used only if a (preferably continuously implemented) examination of the engine conditions identifies a torque reserve that is insufficient to hold the actual operating point, or a new operating point with an increased power requirement cannot be started.

Figure 5:
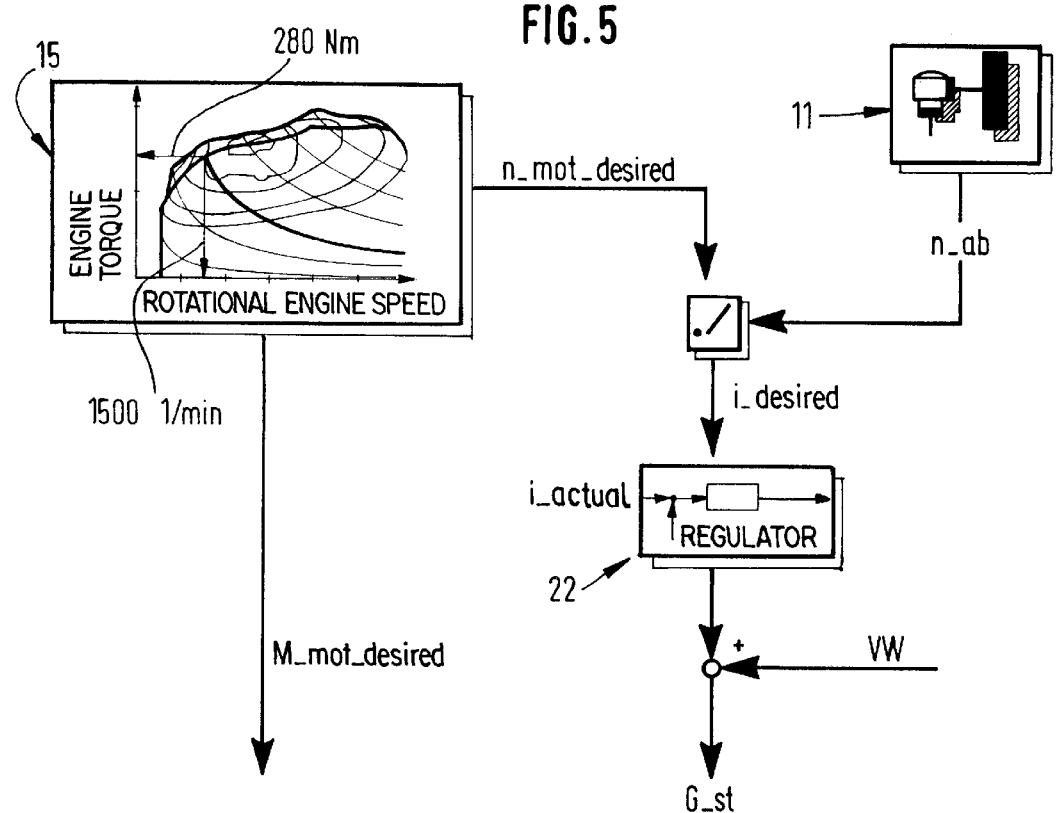
FIG. 5 is a diagrammatic illustration of the control in the transmission ratio regulator operation.

The transmission ratio regulator operation mode is explained in reference to FIG. 5. In this case, as in the case of the torque regulator operation, the unit 15 emits the desired engine torque $M\_mot_{desired}$. In contrast to the torque regulator operation mode, however, this engine torque will not be changed; rather, it is transmitted unchanged to the digital engine control DME. From the desired rotational engine speed $n\_mot_{desired}$ and the rotational transmission output speed $n\_ab$ known from module 11 (or determined by means of a defined algorithm or by defined values), the desired transmission ratio $i_{desired}$ is determined in block 21, and is provided to a regulator 22, which also receives the actual transmission ratio $i_{actual}$. The regulator 22 computes a correction value from the deviation and adds this correction value to a pilot value VW, in which case the sum of these two values results in a value affecting the transmission control value $G\_st$.

Within the physical limits of the engine, by way of the operating chain digital engine control DME and physical engine 13, the desired engine torque $M\_mot_{desired}$ generated in the operating point determination leads to a corresponding effective torque at the input of the transmission 14. The regulating device described according to FIG. 5 acts upon the transmission 14, by way of the regulated variables from the module 12, to control deviations between the desired transmission ratio $i_{desired}$ and the actual transmission ratio $i_{actual}$. As in the case of conventional CVT transmissions or fixed geared transmissions, the transmission output torque $M\_ab$ is therefore the result of the effective engine torque, the transmission ratio and transmission losses.

Figure 6:
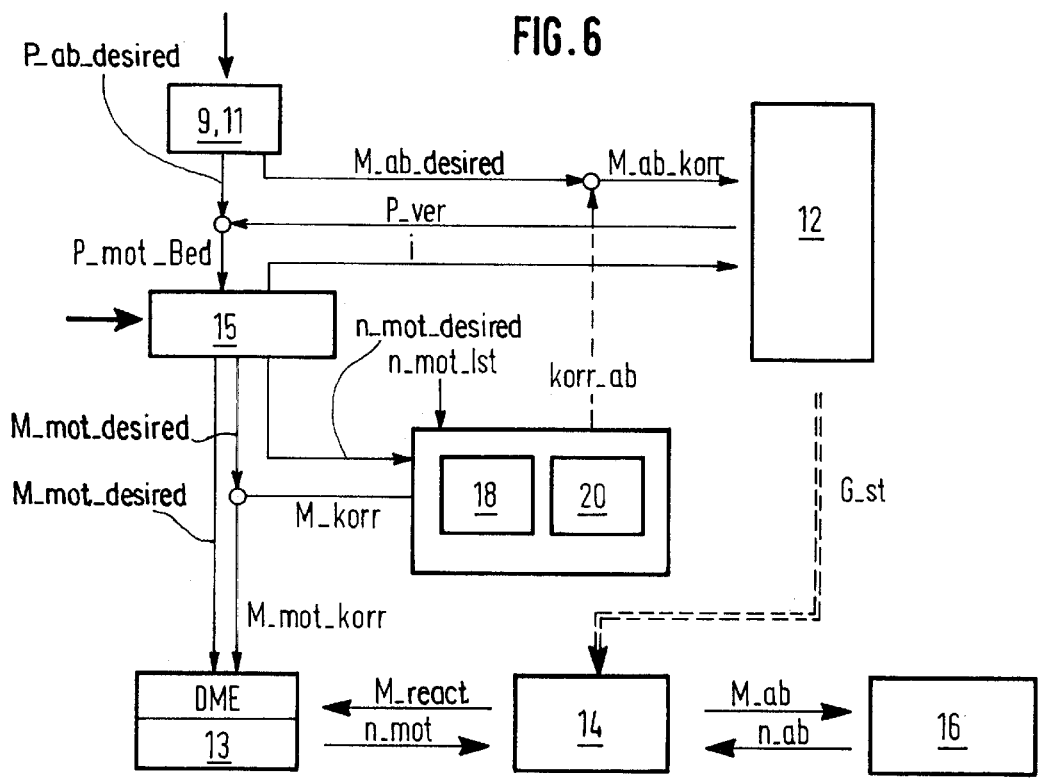
FIG. 6 is a diagram which illustrates a entire sequence of the method explained by means of FIGS. 1 to 5.

The two above-described operating modes (torque regulator operation and transmission ratio regulator operation), can also be used in a mixed form. In particular, a superimposing of regulator systems can exist while taking into account stability criteria and operating situations, as illustrated in FIG. 6. In this case, the same reference numbers and values indicate identical elements. The values characterizing the transmission ratio regulator operation are underlined (i and M mot desired). All other control and regulating values, provided they are not used in the transmission ratio regulator operation, are part of the torque regulator control.

On the whole, the present invention creates a system for controlling or regulating continuously variable automatic transmissions so as equally to cover the "transmission ratio regulator" and the "torque regulator" operating principles. Here, the basic principle consists of the fact that a predefined driving torque intention is implemented by the system in cooperation with the engine control unit and the physical transmission line within the scope of the physical possibilities.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for controlling a driving engine/transmission unit having a continuously variable automatic transmission, in which the transmission output torque acting upon the driving wheels of a vehicle and the engine reaction torque retroacting upon the driving engine can be adjusted via a regulated transmission variable, said method comprising:

predefining a desired transmission output torque and determining the regulated transmission variable;

determining a desired transmission output power from the desired transmission output torque;

calculating a transmission power loss;

determining an engine power requirement of the driving engine from the desired transmission output power and the transmission power loss;

determining a desired engine torque and a desired rotational engine speed from the power requirement of the driving engine; and at least one of performing a torque regulator operation by determining a corrected desired engine torque with one of a predefined regulated transmission variable and a corrected desired transmission output torque, in conjunction with a change of the regulated transmission variable for controlling the rotational engine speed; and performing a transmission ratio regulator operation by determining a desired transmission ratio and a desired engine torque while the regulated transmission variable is changed, such that a determined actual transmission ratio corresponds to the calculated desired transmission ratio.

2. The method according to claim 1, wherein in the torque regulator operation, the desired engine torque is corrected as a function of a difference between actual rotational engine speed and a desired rotational engine speed.

3. The method according to claim 2, further comprising:

determining whether the desired engine torque can be implemented by the driving engine; and reducing the desired transmission output torque if the desired engine torque cannot be implemented.

4. The method according to claim 3, wherein the reduction of the desired transmission output torque is performed as a function of the difference between the actual rotational engine speed and the desired rotational engine speed.

5. The method according to claim 1, wherein in the transmission ratio regulator operation:

an actual transmission ratio is determined from actual rotational engine speed and actual rotational transmission output speed; and a desired transmission ratio is determined via desired rotational engine speed and the actual rotational transmission output speed, via a predefined algorithm or via predefined values.

6. The method according to claim 1, wherein for special system conditions, by changing the regulated transmission variable, an actual transmission ratio is controlled in a targeted manner to a value which differs from a desired transmission ratio.

7. The method according to claim 1, wherein the desired transmission output torque is generated from a wheel torque requirement.

8. The method according to claim 1, wherein the desired engine torque and the desired rotational engine speed are calculated as a function of the engine power requirement by means of a predefined algorithm or are selected by means of predefined values.

9. An apparatus for controlling a driving engine/transmission unit having a driving engine, an engine control unit connected with said driving engine, and a continuously variable automatic transmission, in which the transmission output torque acting upon the driving wheels of a vehicle and the engine reaction torque retroacting upon the driving engine can be adjusted via a regulated transmission variable, said apparatus comprising a transmission control unit having:

a first module for determining a desired transmission output power and a desired transmission output torque;

a second module connected with the first module and the continuously variable transmission, for determining a transmission power loss and the regulated transmission variable;

a third module connected with the first and the second module as well as the engine control unit, for determining a desired engine torque and a desired rotational engine speed from a desired engine power composed of the desired output power and the power loss; and an operating point regulator connected with the third module, for correcting one of the desired engine torque supplied by the third module to the engine control unit and the desired transmission output torque supplied by the first module to the second module.

10. The apparatus according to claim 9, wherein the operating point regulator has an input for receiving an actual rotational engine speed signal.

11. An apparatus for controlling a driving engine/transmission unit having a driving engine, an engine control unit connected with said driving engine, and a continuously variable automatic transmission, in which the transmission output torque acting upon the driving wheels of a vehicle and the engine reaction torque retroacting upon the driving engine can be adjusted via a regulated transmission variable, said apparatus comprising a transmission control unit having:

a first module for determining a desired transmission output power;

a second module connected with the continuously variable transmission, for determining a transmission power loss and the regulated transmission variable;

a third module connected with the first and the second module as well as the engine control unit, for determining a desired engine torque from a desired engine power composed of the desired transmission output power and the transmission power loss, the third module supplying information to the second module concerning the desired transmission ratio, so that the regulated transmission variable can be determined in the second module on the basis of the actual transmission ratio.

* * * * *